United States Patent [19]
Alaze et al.

[11] Patent Number: 5,335,984
[45] Date of Patent: Aug. 9, 1994

[54] ELECTROMAGNETICALLY ACTUATABLE VALVE FOR A HYDRAULIC BRAKE SYSTEM

[75] Inventors: Norbert Alaze, Markgroeningen; Juergen Gruber, Frickenhausen; Guenter Wolff, Schwieberdingen, all of Fed. Rep. of Germany

[73] Assignee: Robert Bosch GmbH, Stuttgart, Fed. Rep. of Germany

[21] Appl. No.: 10,707

[22] Filed: Jan. 29, 1993

[30] Foreign Application Priority Data

Jan. 29, 1992 [DE] Fed. Rep. of Germany ....... 4202389

[51] Int. Cl.5 .......................... B60T 8/36; F16K 31/06
[52] U.S. Cl. ............................. 303/119.2; 137/596.17; 303/900
[58] Field of Search ........................... 137/596.17; 251/129.15–129.22; 303/119.2, 115.2, 900

[56] References Cited

U.S. PATENT DOCUMENTS 5,066,075 11/1991 Kaneda et al. .................. 303/119.2
5,141,298  8/1992 Von Hayn et al. .............. 363/119.2
5,167,442 12/1992 Alaze et al. ...................... 303/119.2

FOREIGN PATENT DOCUMENTS 4030963 4/1992 Fed. Rep. of Germany .

Primary Examiner—Matthew C. Graham
Attorney, Agent, or Firm—Edwin E. Greigg; Ronald E. Greigg

[57] ABSTRACT

A hydraulic brake system including at least one electromagnetically actuatable valve is disposed in a receiving bore. A throttle body at least partly surrounding the valve on one end in the axial direction is provided in the receiving bore and has a throttle restriction in a through bore. In this hydraulic brake system, adjusting the stroke of an armature can be done in a simple manner before the throttle body is installed on the valve. The valve and the throttle body is especially suitable for outlet valves of hydraulic motor-vehicle brake systems.

9 Claims, 2 Drawing Sheets

ELECTROMAGNETICALLY ACTUATABLE VALVE FOR A HYDRAULIC BRAKE SYSTEM

BACKGROUND OF THE INVENTION

The invention is based on a hydraulic brake system with an anti-skid system, particularly for motor vehicles as defined hereinafter. German Patent Application P 40 30 963.0 has already proposed an electromagnetically actuatable valve with a throttle restriction, which has a valve seat body with a valve seat and a valve closing member movable relative to the valve seat. In this electromagnetically actuatable valve, adjusting the armature stroke can be done only with difficulty, because if a throttle disk with a very small throttle bore forms the throttle restriction, then it is difficult to use a measuring instrument with a scanner pin, which must be passed through a flow bore of the valve seat body if it is to engage the valve closing member.

OBJECT AND SUMMARY OF THE INVENTION

The brake system according to the invention has an advantage over the prior art that adjusting the armature strokes can be done in a simple manner before the throttle body is installed on the valve. The scanner pin of a measuring instrument can be passed unhindered into the valve seat body and through the flow bore thereof made to engage the valve closing member. Once the adjustment of the armature stroke has been completed, the valve is inserted into the receiving bore of the valve receptacle, in which the throttle body is for instance disposed. Because there is a separate throttle body, it is possible to use a uniform valve for various applications and various pressure fluid throughputs. No separate support ring for a sealing ring disposed on the circumference of the valve is necessary, because the sealing ring is supported on a face end of the throttle body toward the valve.

For especially simple embodiment of the throttle restriction, it is advantageous if a throttle insert, which has the throttle restriction embodied as a throttle bore, is disposed in the through bore of the throttle body.

For the same reason, it is advantageous if the throttle insert is cup-shaped and the throttle restriction is formed in a bottom of the cup-shaped throttle insert, and if the throttle insert is press-fitted into the through bore of the throttle body. This also assures a solid, secure hold of the throttle insert in the throttle body.

For particularly simple production of the throttle body, it is advantageous if the throttle body is made of plastic or aluminum.

The invention will be better understood and further objects and advantages thereof will become more apparent from the ensuing detailed description of a preferred embodiment taken in conjunction with the drawings

DESCRIPTION OF THE PREFERRED EMBODIMENT

Figure 1:
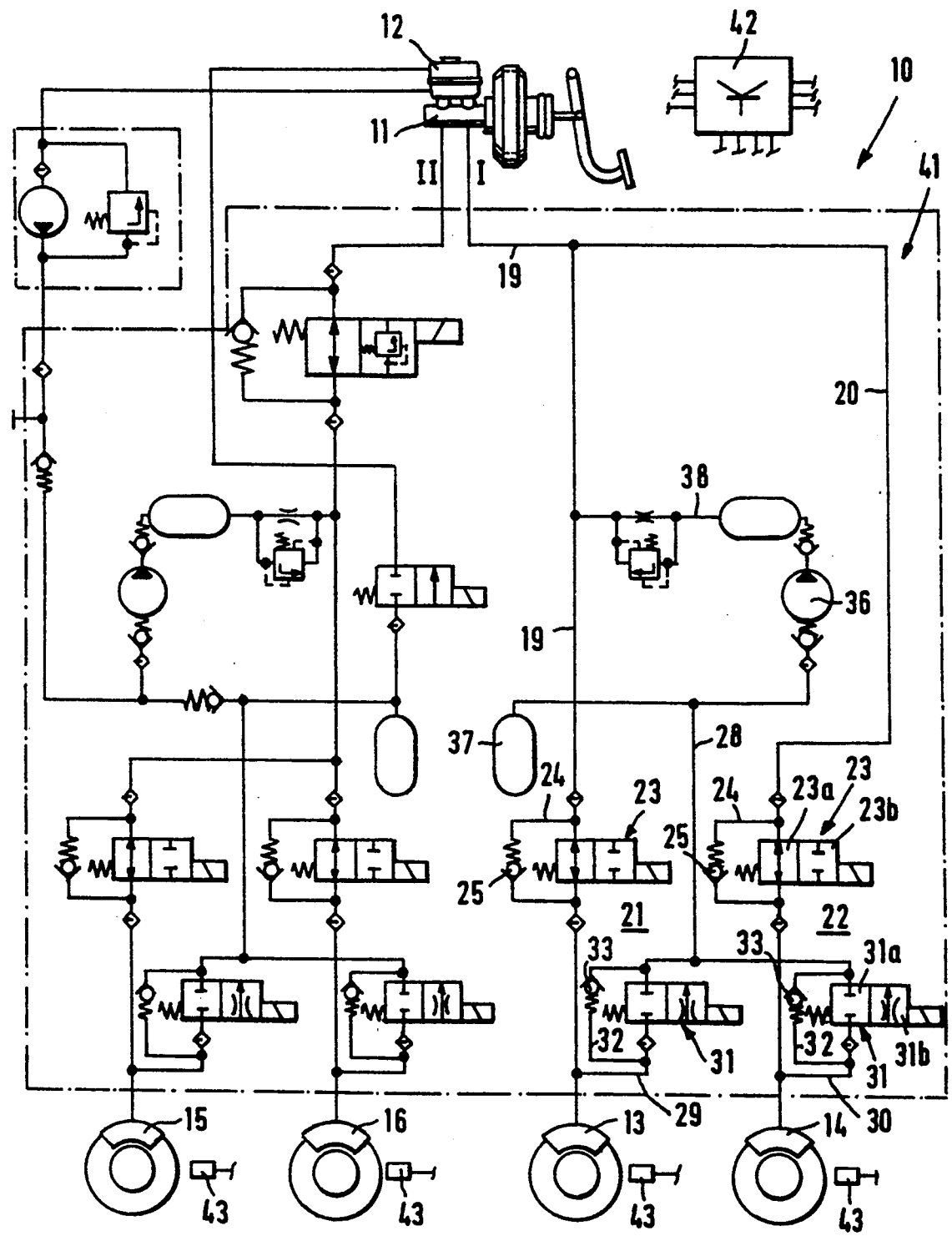
FIG. 1 is a circuit diagram of a hydraulic brake system with electromagnetically actuatable valves.

A hydraulic brake system 10 having an anti-skid system for motor vehicles, shown by way of example in FIG. 1, has a pedal-actuatable master brake cylinder 11 with a pressure fluid tank 12. A first brake circuit I is by way of example assigned to wheel brake cylinders 13, 14 of nondriven vehicle wheels, for instance the front wheels of the vehicle. Wheel brake cylinders 15, 16 of driven vehicle wheels, for instance the rear wheels of the vehicle, are connected to a second brake circuit II, for example. This means that the brake system 10 has what is called a TT-type brake circuit distribution. Brake circuit I will be described in detail now:

The first brake circuit I has a first brake line 19 beginning at the master brake cylinder 11 and leading to the wheel brake cylinder 13. From this brake line 19, a second brake line 20 branches off to the wheel brake cylinder 14 of this brake circuit I. One valve assembly 21 and 22 is assigned to each of the wheel brake cylinders 13, 14, respectively, for brake pressure modulation. Each of the valve assemblies 21, 22 has an inlet valve 23 disposed in the respective brake line 19, 20. This valve is embodied as an electromagnetically actuatable 2/2-way valve, with a spring-actuated open position 23a and an electromagnetically switchable blocking position 23b. Parallel to each inlet valve 23 is a respective bypass line 24, each with a check valve 25 disposed in it. The forward direction of the applicable check valve 25 is from the applicable wheel brake cylinder 13, 14 to the master brake cylinder 11, which allows a return flow of the pressure fluid as soon as the pressure toward the wheel brake cylinder exceeds the pressure toward the master brake cylinder by a characteristic pressure value for the check valve 25.

A split return line 28 begins at the associated brake lines 19, 20, between the respective inlet valve 23 and the wheel brake cylinders 13, 14. Of the valve assemblies 21, 22 for the brake pressure modulation, one outlet valve 31 each is disposed in the respective return line branch 29 and 30. The outlet valves 31 are embodied as electromagnetically actuatable 2/2-way valves. They have a spring-actuated blocking position 31a and an electromagnetically switchable open position 31b with a throttling action. When the anti-skid system is in operation, the throttling action slows down the reduction of pressure in the wheel brake cylinders 13, 14, thereby improving the control quality of the anti-skid system. A variation in the throttling action of the outlet valves 31 in their open position 31b makes it possible to adapt to a required pressure reduction gradient in the wheel brake cylinders 13, 14. A check valve 33 with a forward direction to the respective wheel brake cylinder 13, 14 is disposed in each bypass line 32, parallel to the outlet valves 31.

The return line 28 leads to the intake side of a high-pressure pump 36. A reservoir chamber 37 for receiving pressure fluid withdrawn from the wheel brake cylinders 13, 14 is connected to the return line 28 between the intake side of the high-pressure pump 36 and the outlet valves 31 of the valve assemblies 21, 22. On the pressure side of the pump, a feed line 38 for pressure fluid begins at the high-pressure pump 36 and is connected to the first brake line 19 between the valve assembly 21 and the master brake cylinder 11.

The elements of the hydraulic brake system 10 disposed between the master brake cylinder 11 and the wheel brake cylinders 13–16 are part of an anti-skid and traction control system 41. This system 41 includes an electronic control unit 42 and wheel rotation sensors 43 assigned to the various vehicle wheels. The control unit 42 can evaluate signals from the wheel rotation sensors 43 and convert them into switching signals for the electronic component assemblies of the brake system 10. Anti-skid operation is possible at the nondriven vehicle wheels in brake circuit I, and both anti-skid and traction control operation are possible at the driven vehicle wheels in brake circuit II (not described above).

Figure 2:
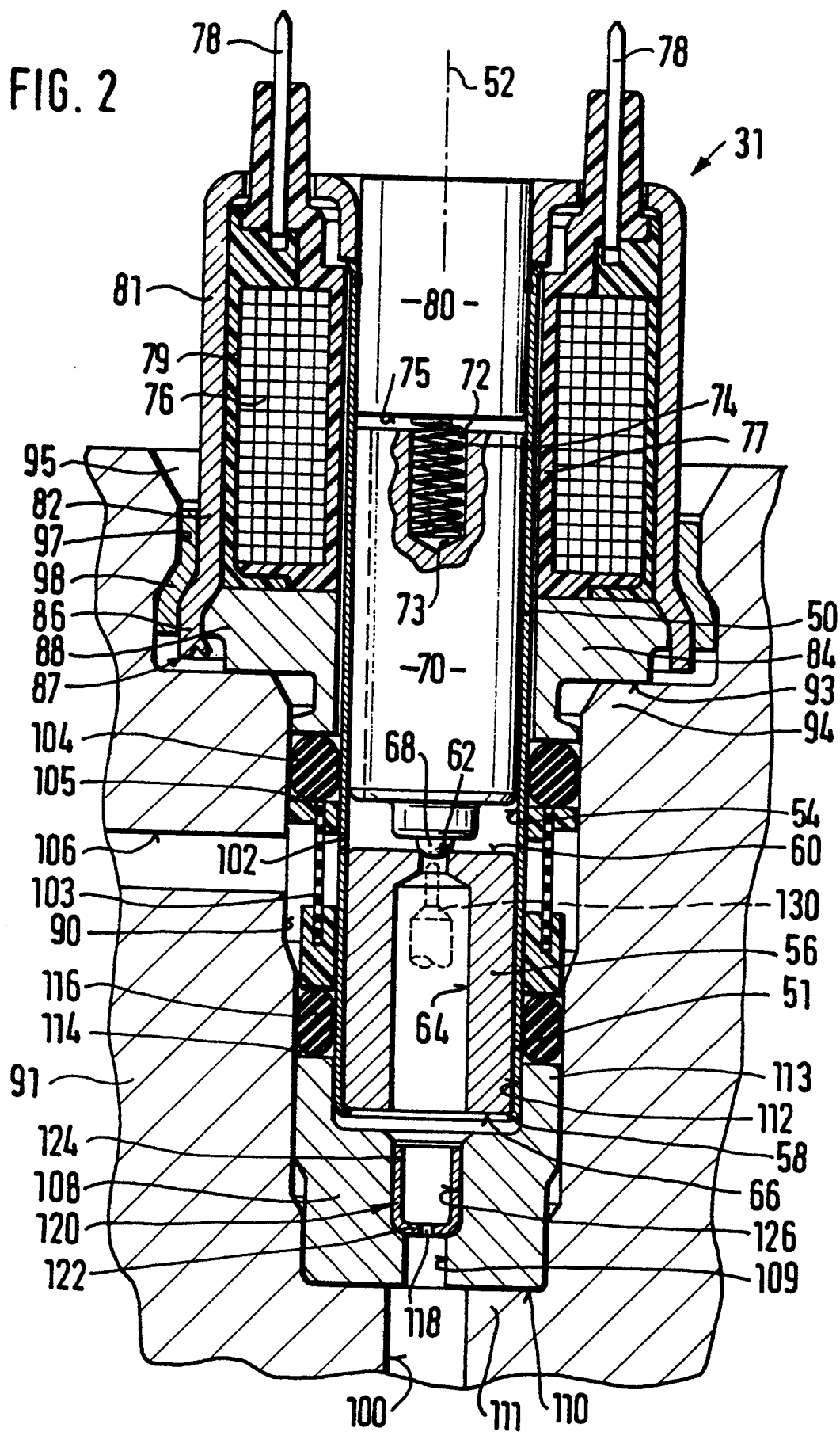
FIG. 2 is a longitudinal section through such a valve.

FIG. 2 shows an electromagnetically actuatable outlet valve 31 of the valve assemblies 21, 22 for brake pressure modulation in the applicable wheel brake cylinder 13, 14. The outlet valve 31 has an elongated housing sheath 50, with a longitudinal bore 54 extending concentrically to a longitudinal valve axis 52. On one end 51 of the housing sheath 50, a housing component, known as a valve seat body 56, is inserted all the way, for instance, into the longitudinal bore 54 in the axial direction. By way of example, the valve seat body is press-fitted into the longitudinal bore 54 of the housing sheath 50 and is axially retained by a radially inwardly flanged retaining rim 58 formed on the end 51 of the housing sheath 50. On its end remote from the retaining rim 58, the valve seat body 56, which for instance is tubular, has an upper face end 60 that has a fixed valve seat 62, for instance located concentrically with the longitudinal valve axis 52. Beginning at the fixed valve seat 62, a continuous, stepped flow bore extends within the valve seat body 56, concentrically with the longitudinal valve axis 52, and connects the valve seat 62 at the upper face end 60 with a lower face end 66 of the valve seat part 56 remote from the upper face end 60, enabling a flow of the pressure fluid from the valve seat 62 to the lower face end 66, or in the opposite direction. A valve closing member 68, which for instance is spherical, cooperates with the fixed valve seat 62 of the tubular valve seat body 56 and is joined, for instance directly, to a cylindrical armature 70. The valve seat 62 and the valve closing member 68 accordingly form a seat valve. The armature 70 is slideably supported in the longitudinal bore 54 of the elongated housing sheath 50.

On its end remote from the valve seat body 56, the armature 70 has a blind bore 72, for instance extending concentrically to the longitudinal valve axis 52, and in which a restoring spring 74 is disposed. The restoring spring 74 is supported by one end on a bottom 73 of the blind bore 72 and by its other end by a lower face end 75 of an inner pole 80 protruding at least part way into the longitudinal bore 54 on the end of the housing sheath 50 remote from the valve seat body 56. The restoring spring 74 urges the armature 70 to move with the valve closing member 68 in the direction of the fixed valve seat 62 and thus to close the seat valve. The armature 70 and the inner pole 80 are surrounded at least partway in the axial direction by a magnet coil 76. The magnet coil 76 has a coil body 77 with electrical connection plugs 78 and an extruded plastic coating 79. A cup-shaped housing jacket 81 axially encompasses the magnet coil 76, for instance, completely with a cylindrical part 82 and partly surrounds a housing flange part 84 disposed toward the valve seat body 56, adjacent to the magnet coil 76. The cup-shaped housing jacket 81 is joined on its lower end 86, toward the valve seat part 56, for instance by means of a crimped connection 87, to a radially outwardly pointing connecting flange 88 of the housing flange part 84; the housing jacket 81 has an enlarged diameter on its end 86.

By way of example, the outlet valve 31 is disposed in a receiving bore 90 of a valve receptacle 91, such as a valve lock or a hydraulic unit; the housing jacket 81 and its electrical connection plugs 78 protrude axially at least partway out of the receiving bore 90. With a bearing face end 93 of the housing flange part 84 oriented toward the valve seat body 56, the outlet valve 31 rests on a retaining shoulder 94 of the stepped receiving bore 90.

On its upper end 95, at which the outlet valve 31 protrudes axially out of the valve receptacle 91, the receiving bore 90 has a radially inwardly pointing cross-sectional constriction 97. A retaining ring 98 is press-fitted into the receiving bore 90, beginning at this upper end 95, in the radial direction between the cylinder part 82 of the housing jacket 81 and the wall of the receiving bore 90; at least in the region of the cross-sectional constriction 97 of the receiving bore 90 and of the lower end 86 of the housing jacket 81 having an enlarged diameter, this ring extends in the direction of the longitudinal valve axis 52 and forms a form-locking and positive connection between the outlet valve 31 and the receiving bore 90 of the valve receptacle 91.

On its end remote from the cross-sectional constriction 97, the stepped receiving bore 90 has a flow segment 100, which communicates with the flow bore 66 of the valve seat body 56 and forms a segment toward the master brake cylinder of a return line branch 29, 30. The wall of the housing sheath 50 is pierced axially by a single through opening 102, for example, in the region between the housing flange part 84 and the valve seat body 56. An annular filter element 103 that covers the through opening 102 with a filter screen is disposed on the circumference of the housing sheath 50 and serves to filter the pressure fluid. An upper sealing ring 104 is disposed in the axial direction between an upper face end 105 of the filter element 103 oriented toward the housing flange part 84 and the housing flange part 84 itself; this sealing ring rests tightly on the circumference of the housing sheath 50 and on the wall of the receiving bore 90.

A flow conduit 106, for instance extending at right angles to the longitudinal valve axis 52, is embodied in the valve receptacle 91 and communicates, in the region of the through opening 102 of the housing sheath 50, with the receiving bore 90 of the valve receptacle 91; it forms a segment toward the wheel brake cylinder of the return line branch 29 or 30 and serves to deliver pressure fluid on the wheel brake cylinder side to the outlet valve 31.

On the end remote from the cross-sectional constriction 97, a throttle body 108 is disposed in the receiving bore 90 of the valve receptacle 91. The throttle body 108 has a continuous, stepped through bore 109, for instance concentrically with the longitudinal valve axis 52, and is embodied as approximately cup-shaped, for example. By a lower face end 110 remote from the valve seat body 56, the throttle body 108 rests on a radially extending shoulder 111 of the stepped receiving bore 90. With a cylindrical part 113 that has an enlarged segment 112 of the through bore 109, the throttle body 108 fits axially partway around the end 51 of the housing sheath 50 that is remote from the magnet coil 76 and has the retaining rim 58. The cylindrical part 113 of the throttle body 108 has an upper face end 114, oriented toward the filter element 103. Axially between the filter element 103 and the upper face end 114 of the throttle body 108, a lower sealing ring 116 is disposed on the circumference of the housing sheath 50; it is axially supported on the upper face 114 and rests tightly on the circumference of the housing sheath 50 and on the wall of the receiving bore 90 of the valve receptacle 91. A separate support ring for the lower sealing ring 116 is not needed.

A throttle restriction 118 is provided in the through bore 109 of the throttle body 108. To that end, a throttle insert 120, for instance recessed in cup-shaped fashion, and having the throttle restriction 118 is provided in the through bore 109 of the throttle body 108. The cup-shaped throttle insert 120 has a throttle restriction 118, embodied in a bottom 122 as a throttle bore, having a diameter of a few tenths of a millimeter, such as 0.3 mm, and also has a cylindrical part 124 adjoining the bottom part 122 and oriented toward the valve seat body 56. The cylindrical part 124 of the throttle insert 120 has a slightly larger diameter, over at least part of its length in the axial direction, than the stepped through bore 109 of the throttle body 108 in a press-fit segment 126. This assures that the throttle insert 120, press-fitted into the through bore 109 of the throttle body 108, for instance, is held solidly and securely. The throttle body 108 is made of a plastic, for instance. However, it may also be formed out of aluminum or some other metal. The throttle restriction 118 embodied as a throttle bore in the throttle insert 120 may also, by way of example, be embodied as a segment of the through bore 109 of the throttle body 108.

The flow of pressure fluid from the flow conduit 106 on the wheel brake cylinder side to the flow segment 100 of the receiving bore 90 on the master brake cylinder side causes a pressure drop at the valve seat 62, also acting as a throttle, of the valve seat body 56. The effect of this pressure drop is that the lower sealing ring 116, disposed on the circumference of the housing sheath 50, is pressed against the upper face end 114 of the cylindrical part 113 of the throttle body 108, so that it reliably performs its sealing function and prevents the pressure fluid, subject to a backup pressure and located upstream of the throttle restriction 118 when the outlet valve 31 is in an open position 31b from being capable of bypassing the throttle restriction 118 of the throttle body 108 by flowing between the circumference of the throttle body 108 and the wall of the receiving bore 90.

The backup pressure acts upon the throttle body upstream of the throttle restriction 118 of the throttle body 108 which is supported on the retaining shoulder 111 of the receiving bore 90 of the valve receptacle 91 via the lower face end 110 of the throttle body 108. In contrast to a throttle restriction 118 provided in the valve seat body 56, this prevents damaging tensile strain on the housing sheath 50.

The stroke of the valve closing member 68 and hence of the armature 70 is adjusted by means of a length measuring instrument. To this end, a scanning pin 130, suggested by dashed lines, is passed into the flow bore 64 of the valve seat body 56 from below and made to engage the valve closing member 68, before the outlet valve 31 is installed in the receiving bore 90 of the valve receptacle 91. The armature stroke is then adjusted by displacing the inner pole 80 in the longitudinal bore 54 of the housing sheath 50 in the direction of the longitudinal valve axis 52. Finally, the inner pole 80 is firmly joined to the housing sheath 50, for instance by means of a weld. The completely installed and adjusted outlet valve 31 is thrust into the receiving bore 90 of the valve receptacle 91, in which the throttle body 108 has already been disposed, resting on the retaining shoulder 111 of the receiving bore 90. Adjusting the armature stroke is thus made possible in a simple manner before the throttle body 108 is installed on the end of the outlet valve 31 remote from the magnet coil 76.

In brake pressure modulation, during which the outlet valve 31 is switched into its open position 31b and accordingly the valve closing member 68 is lifted from its valve seat 62, pressure fluid flows in pressure reduction phases through the flow conduit 106 of the valve receptacle 91 and through the through opening 102 into the longitudinal bore 54 of the housing sheath 50, and from there past the valve seat 62 and through the flow bore 64 of the valve seat body 56, overcoming the throttle restriction 118, provided in the throttle body 108, of the throttle insert 120, to reach the flow segment 100 of the receiving bore 90 and the high-pressure pump 36 or storage chamber 37. The sealing rings 104, 116 prevent an escape of pressure fluid from the receiving bore 90 of the valve receptacle 91 and also prevent bypassing of the throttle restriction 118.

If the outlet valve 31 is in its blocking position 31a, then the pressure fluid cannot flow through the outlet valve. The check valve 33 disposed in the bypass line 32 makes it possible for the pressure fluid, after overcoming a characteristic, predetermined opening pressure of the check valve 33, to flow in the opposite direction, or in other words from the high-pressure pump 36 or storage chamber 37 in the direction of the wheel brake cylinders 13, 14.

The throttle body 108 disposed on one end of the outlet valve 31 makes it possible to select the throttle restriction in accordance with requirements, to use a uniform valve for various applications and pressure fluid throughputs, and to carry out a simple adjustment of the armature stroke prior to the installation of the throttle body 108.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. An electromagnetically actuatable valve for a hydraulic brake system having an anti-skid system for motor vehicles, said electromagnetically actuatable valve is disposed in a receiving bore of a valve receptacle, said valve has a valve seat body having a flow bore and a valve seat, a valve closing member movable relative to the valve seat and actuatable by means of an armature and a magnet coil, an elongated housing sheath (50) surrounding said armature and containing said valve seat body, and at least one sealing ring on a circumference of said elongated housing sheath, a throttle body (108) having a cylindrical part (113) and an inside of said cylindrical part being hollow, said hollow cylindrical part (113) at least partly surrounding one end of said elongated housing sheath (113) in an axial direction, and said throttle body having a through bore (109) disposed in the receiving bore (90) of the valve receptacle (91); that a sealing ring (116) is supported on one face end (114) of the throttle body (108) oriented toward the valve (31); and that a throttle restriction (118) is provided in the through bore (109) of the throttle body (108).

2. An electromagnetically actuatable valve as defined by claim 1, in which a throttle insert (120) having the throttle restriction (118) is disposed in the through bore (109) of the throttle body (108).

3. An electromagnetically actuatable valve as defined by claim 2, in which the throttle insert (120) is press-fitted into the through bore (109) of the throttle body (108).

4. An electromagnetically actuatable valve as defined by claim 2, in which the throttle insert (120) is recessed in cuplike fashion, and the throttle restriction (118) is embodied in a bottom part (122) of the cup-shaped throttle insert (120).

5. An electromagnetically actuatable valve as defined by claim 4, in which the throttle insert (120) is press-fitted into the through bore (109) of the throttle body (108).

6. An electromagnetically actuatable valve as defined by claim 4, in which the throttle restriction (118) is embodied as a throttle bore.

7. An electromagnetically actuatable valve as defined by claim 1, in which the throttle restriction (118) is embodied as a throttle bore.

8. An electromagnetically actuatable valve as defined by claim 1, in which the throttle body (108) is embodied of plastic.

9. An electromagnetically actuatable valve as defined by claim 1, in which the throttle body (108) is embodied of aluminum.

* * * * *